(12) United States Patent
Diemer et al.

(10) Patent No.: US 6,626,276 B2
(45) Date of Patent: Sep. 30, 2003

(54) CLUTCH DISK

(75) Inventors: Matthias Diemer, Niederwerrn (DE); Andreas Orlamünder, Schweinfurt (DE); Andreas Dau, Würzburg (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/915,600

(22) Filed: Jul. 26, 2001

(65) Prior Publication Data

US 2002/0017443 A1 Feb. 14, 2002

(30) Foreign Application Priority Data

Aug. 3, 2000 (DE) .......................................... 100 37 897

(51) Int. Cl.[7] .............................................. F16D 47/02
(52) U.S. Cl. ...................... 192/30 V; 192/209; 192/211
(58) Field of Search ............................... 192/30 V, 209, 192/211, 55.6

(56) References Cited

U.S. PATENT DOCUMENTS

| 1,964,054 | A | * | 6/1934 | Harris ......................... 192/68 |
| 4,860,872 | A | * | 8/1989 | Flotow .................. 188/218 XL |
| 4,913,275 | A | * | 4/1990 | Kobayashi et al. .......... 192/209 |
| 4,949,831 | A | * | 8/1990 | Ohga et al. ............. 192/107 C |
| 5,052,244 | A | * | 10/1991 | Kamiya et al. ............. 192/205 |
| 5,322,151 | A | * | 6/1994 | Denton et al. ......... 192/107 M |
| 5,355,985 | A | * | 10/1994 | Thirion De Briel et al. 192/107 C |
| 6,068,098 | A | * | 5/2000 | Yamamoto ................... 192/209 |

* cited by examiner

Primary Examiner—Rodney H Bonck
Assistant Examiner—Eric M Williams
(74) Attorney, Agent, or Firm—Cohen, Pontani, Lieberman & Pavane

(57) ABSTRACT

A clutch disk has a hub area with a rotational axis, the hub area carrying a friction lining assembly radially outside of the hub area. A damper mass assembly can move circumferentially around the rotational axis relative to the hub area and the friction lining assembly against the action of an elastic support assembly.

17 Claims, 3 Drawing Sheets

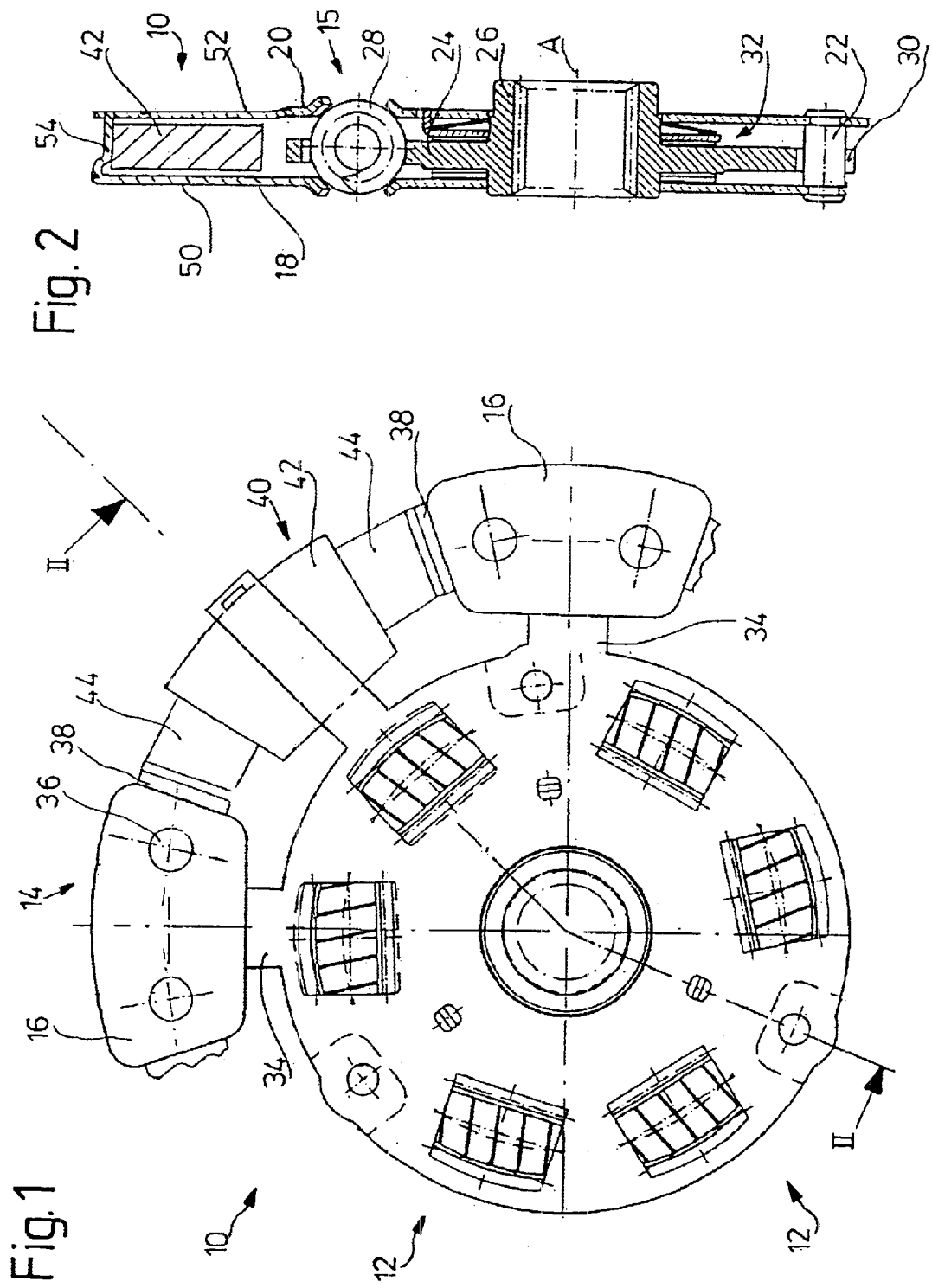

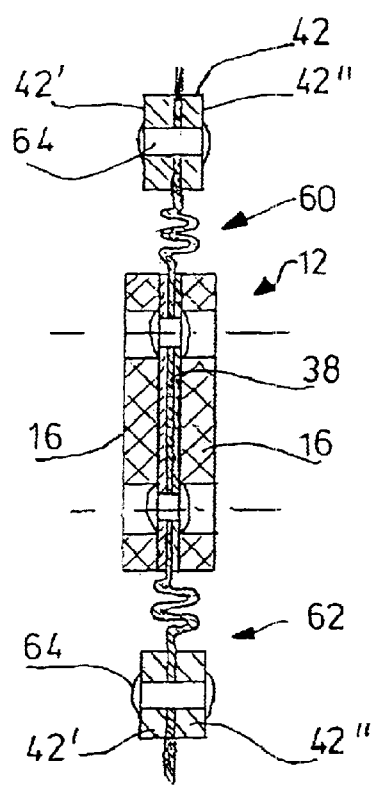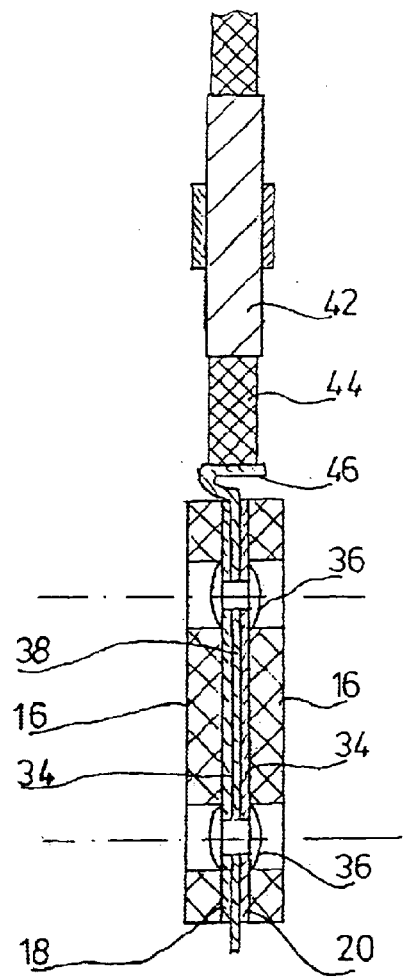

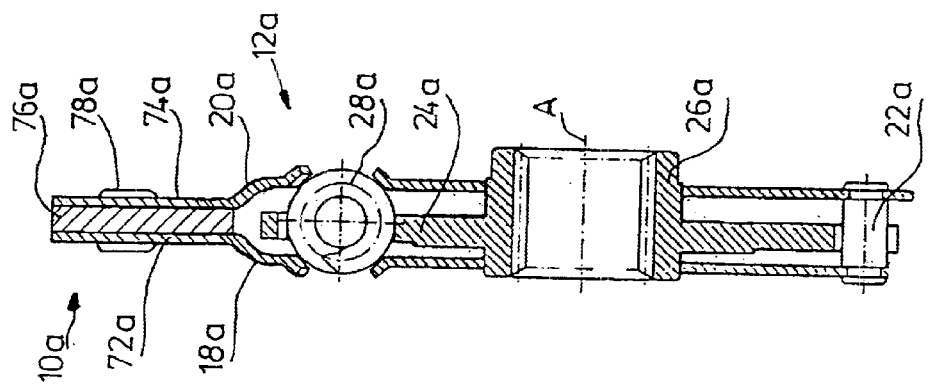
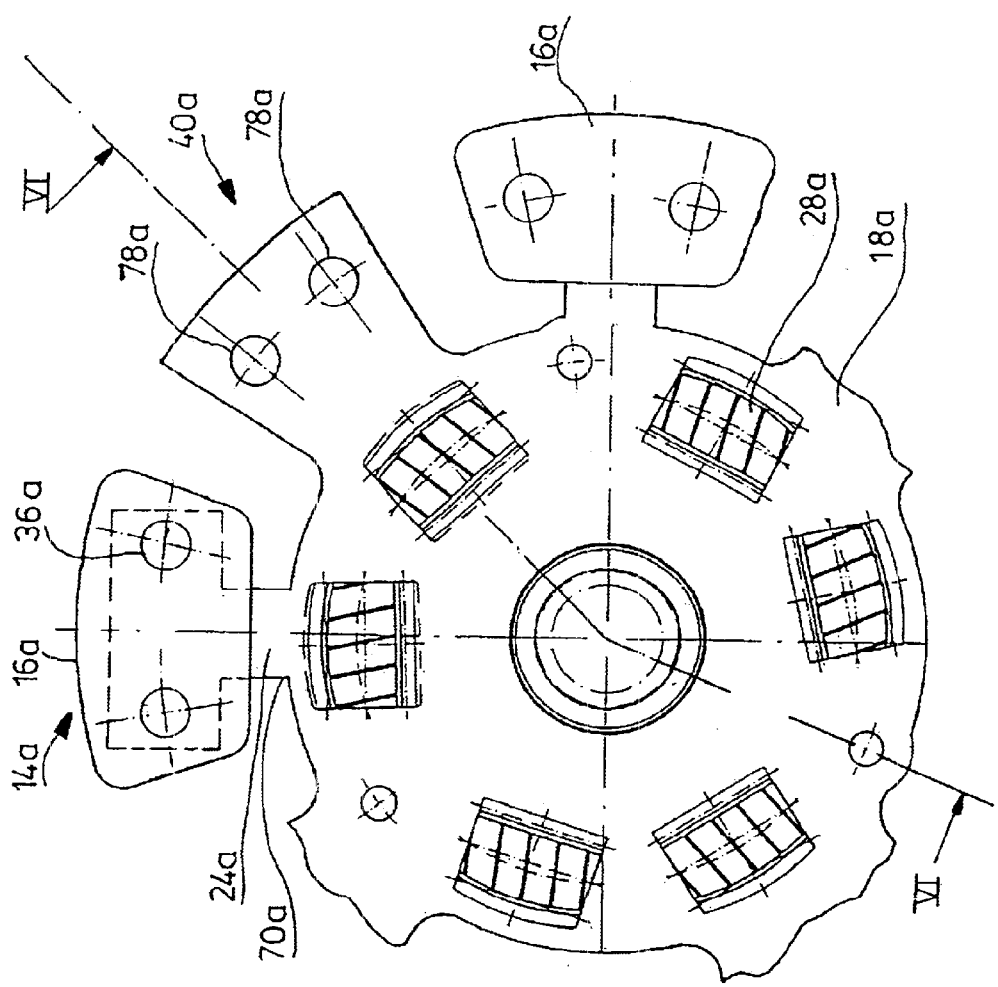

CLUTCH DISK

BACKGROUND OF THE INVENTION

1. Field of the Invention

The present invention pertains to a clutch disk comprising a hub area and a friction lining assembly supported in a radially outer part of the hub area.

2. Description of the Related Art

In clutch disks of this type, the friction lining assembly is designed to be clamped between opposing friction surfaces of a flywheel and, for example, a pressure plate so that torque can be transmitted. In slip mode, however, that is, when there is relative motion between the friction lining assembly and the flywheel or pressure plate, there is the danger that so-called frictional vibrations can be excited, which can lead to acoustically perceivable low-frequency vibrations, especially when several areas are being excited in phase with each other, and also to variations in the frictional force or torque being transmitted, which is referred to as "grabbing". So that rotational irregularities occurring in the drive state can be absorbed or damped, clutch disks are often designed with so-called torsional vibration dampers, in which damping springs act in the path of torque transmission between a friction lining assembly and the power take-off area, which can be, for example, an area of the clutch disk connected to the transmission input shaft. The stiffness of these damper springs, however, is optimized for the rotational vibrations to be expected in the rotational mode. The frictional vibrations comprising different frequencies and amplitudes, however, cannot usually be damped by damper springs of this type.

SUMMARY OF THE INVENTION

It is the task of the present invention to provide a clutch disk in which the occurrence of frictional vibrations can be avoided almost completely.

This task is accomplished in accordance with the invention by a clutch disk comprising a hub area and a friction lining assembly carried on a radially outer part of the hub area.

In addition, a damper mass assembly is also provided, which can move in the circumferential direction around a rotational axis with respect to the friction lining assembly and with respect to the hub area against the action of an elastic support device.

The damper mass assembly provided in the clutch disk according to the invention can vibrate freely relative to the friction lining assembly and/or relative to the hub area under the elastic effect of the support device and thus, upon excitation of frictional vibrations, can build up an opposing vibration, which ultimately contributes to the cancelling-out of the frictional vibrations. By appropriate selection of the elasticity of the support device and of the mass of the damper mass assembly or of the shape of this assembly, the system can be tuned to specific excitation frequencies. In this way, primarily the system-specific and the generally known natural frequencies of the frictional vibrations can be damped.

To cancel out or to damp the frictional vibrations as efficiently as possible, it is proposed that the area where the mass of the damper mass assembly which makes the most essential contribution to the damping of the vibrations be located radially in the area of the friction lining assembly.

It can be provided, for example, that the friction lining assembly has a plurality of friction lining elements arranged in sequence around the circumference around the axis of rotation, and that a part of the damper mass is provided between at least two of the friction lining elements arranged in sequence around the circumference. In this case, it is advantageous for the damper mass part to be supported in the circumferential direction relative to at least one of the two friction lining elements or one of the support areas of the hub area carrying these elements by the elastic support device.

To ensure here at the same time that excessive radial load on the elastic support device cannot occur, it is also possible to provide a circumferential movement guide device for the minimum of one damper mass part, by means of which this part is guided as it moves in the circumferential direction and supported radially from the outside against the centrifugal forces which develop.

For example, the design can be such that the hub area comprises two cover disk elements, which are a certain axial distance apart and the radially outer areas of which carry the friction lining elements, at least one of these cover disk elements extending radially outward over the minimum of one damper mass part to provide the circumferential movement guide device. In this case, it is advantageous for the hub area to have a central disk element, which is supported relative to the disk cover elements by way of a damper element assembly and which is designed to be connected to a shaft.

In an alternative embodiment, it can be provided that the damper mass assembly is supported relative to a part of the hub area carrying the friction lining assembly by a plurality of damper elements, which essentially constitute the elastic support device. Here the design can be such that the damper mass assembly comprises two cover disk elements, one of which is located on each axial side of a central disk element, which carries the friction lining assembly, the radially outer area of the cover disks carrying a plurality of damper mass parts. The damper elements are supported against the cover disk elements and the central disk element. The central disk element is preferably designed to be connected to a shaft.

To ensure in the clutch disk according to the invention that, regardless of the instantaneous torque being transmitted via the clutch disk, the damper mass assembly can optimally fulfill the function for which it is originally intended, namely, the function of cancelling out or damping frictional vibrations, it is proposed that the damper mass assembly not be installed in the path of torque transmission of the clutch disk.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1 shows a partially axial view of a clutch disk according to the invention;

FIG. 2 shows a cross-sectional view of the clutch disk shown in FIG. 1 along line II—II of FIG. 1;

FIG. 3 shows a first design variant according to the invention for the elastic support of the damper mass parts, extending in the circumferential direction;

FIG. 4 shows a second design variant according to the invention for the elastic support of the damper mass parts;

FIG. 5 shows a view similar to that of FIG. 1 of an alternative design variant of the clutch disk according to the invention; and FIG. 6 shows a cross-sectional view of the clutch disk shown in FIG. 5 along line VI—VI of FIG. 5.

DETAILED DESCRIPTION OF THE PRESENTLY PREFERRED EMBODIMENTS

FIGS. 1 and 2 show a first design variant of a clutch disk 10 according to the invention. This clutch disk 10 comprises a hub area 12, which carries a friction lining assembly 14 in the form of a several friction lining elements 16 arranged in sequence around the circumference in the radially outer area. As can be seen in FIG. 2, the hub area 12 also comprises a torsional vibration damper 15. Two cover disk elements 18, 20, a certain axial distance apart, are also provided, these elements being permanently connected to each other by a plurality of bolt elements 22. Between these cover disk elements 18, 20 is a central disk element 24, which is designed, for example, as an integral part of a hub 26 on the radially inward side. The hub 26 is designed to be connected to a power take-off shaft, such as the transmission input shaft, so that it can move in the axial direction but cannot rotate. The cover disk elements 18, 20 and the central disk element 24 each have spring windows with guide edges, against which damping springs 28 are supported in the circumferential direction. Thus the cover disk elements 18, 20 and the central disk element 24 are able to rotate with respect to each other within a limited angular range in the circumferential direction against the action of the damping springs 28, the angle of rotation being limited by the bolts 22, which engage in corresponding recesses 30 in the central disk element 28. In addition, a frictional damping device 32 also acts between the cover disk elements 18, 20 and the central disk element 24.

The friction lining elements 16 are attached by means of, for example, rivets 36, to the radially outward-projecting support sections 34 of at least one of the cover disk elements 18, 20. In the diagram of FIG. 3, it can be seen that preferably both cover disk elements 18, 20 have corresponding radially outward extending sections 34 and that the friction lining elements 16 are permanently attached in pairs to the two axial sides by the clinch bolts 36 and/or are bonded with an adhesive to the sections 34. A circumferential support element 38 is enclosed between the two sections 34 of the cover disk elements 18, 20; the function of this support element will be described below.

It can be seen in FIG. 1 that a part of a damper mass assembly 40 is provided between two friction lining elements 16 or pairs of friction lining elements 16 in the circumferential direction. This part can comprise, for example, a damper mass part 42, which is situated in approximately the same radial area as the friction lining elements 16. It can be seen in the diagram of FIG. 3 that the damper mass part 42, which could also consist of several individual parts, is supported in the circumferential direction by elastic elements 44, such as rubber elements or the like, attached to bent-over terminal support areas 46 of the associated circumferential support elements 38. The elastic elements 44 are preferably vulcanized onto both the damper mass part 42 and onto the support areas 46. The arrangement shown in FIG. 1 is thus obtained, in which an individual damper mass part 42 is supported in the circumferential direction with respect to the two friction lining elements 16 located at both circumferential ends thereof or with respect to the sections 34 supporting these elements by way of an associated circumferential support element 38. Because of the elasticity of the elastic elements 44, therefore, each of these damper mass parts 42 can vibrate in the circumferential direction relative to the friction lining elements 16 and also relative to the hub area 12 of the clutch disk 10. Two radial support sections 50, 52 of the cover disk elements 18, 20 provide support radially from the outside, one of support sections being provided with a part 54, which extends essentially axially over the associated damper mass part 42 on the radially outward side and is fits into a corresponding recess in the other support section. The sections 50, 52, 54 thus provide radial support and also guide the circumferential movement of the damper mass parts 42. By providing low-friction material, especially in the area of section 54, the damper mass parts 42 can move circumferentially with almost complete freedom from frictional effects.

When frictional vibrations, which usually have a certain natural frequency, that is, a pronounced maximum at a certain frequency, develop during slip operation of a friction clutch equipped with a clutch disk of this type, the damper mass parts 42 of the damper mass assembly 40 arranged in sequence around the circumference execute a counter-vibration, the vibration frequency of which is determined essentially by the elasticity of the elastic elements 44 and the masses of the damper mass parts 42. By appropriate tuning of these parameters to the vibration excitation frequency expected during slip operation, a counter-vibration can be built up which cancels out the excited vibrations. By providing damper mass parts of different masses or elastic elements 44 with different moduli of elasticity, it is possible to establish a wide-band cancellation spectrum or to tune the system to more than one excitation frequency.

Because the damper mass parts 42 are not in the path of torque transmission of the clutch disk 10, they can provide the intended cancellation function, that is, the buildup of a counter-vibration, regardless of the torque being transmitted via the clutch disk at the moment in question.

FIG. 4 shows an alternative design for the connection of the damper mass parts 42 to the hub area 12. It can be seen that here the circumferential support elements 38 are provided on both circumferential sides of the friction lining elements 16 in the manner of corrugated springs like bellows with elastic sections 60. The damper mass parts 42, which can have two sections 42', 42", are attached by clinch bolts 64 or the like to these circumferential support elements 38. Because of the greater strength of the connections in a design of this type, sections 50, 52, 54 of the cover disk elements 18, 20 can be omitted.

In the design variant shown in FIGS. 1–4, the functional of the torsional vibration damper present near the clutch disk 10 and in the path of torque transmission, is essentially to damp rotational irregularities which occur in the drive state. There is also another elasticity provided, which is not integrated into the path of torque transmission but which serves instead to build up a counter-vibration during the occurrence of frictional vibrations. The additional elasticity can therefore be tuned optimally to the effects caused by such vibrations, without the need to take into consideration the torques to be transmitted by the clutch disk and the rotational irregularities which may occur.

An alternative design is described in connection with FIGS. 5 and 6. Components which correspond to those already described above with respect to their design or function are indicated by the same reference number plus an "a".

In the case of the design according to FIGS. 5 and 6, the friction lining elements 16a are carried not by the cover disk elements 18a, 20a, but rather by the radially outward-projecting sections 70a of the central disk element 24a. Between two friction lining elements 16a or pairs of friction lining elements 16a in sequence around the circumference, the cover disk elements 18a, 20a have radially outward-projecting extensions 72a, 74a, between which there is a damper mass part 76a. The extensions 72a, 74a are permanently attached to the associated damper mass part 76a by clinch bolts 78a or the like.

The damper springs 28a again act between the central disk element 24a and the cover disk elements 18a, 20a, these springs being supported in the circumferential direction against guide edges of the cover disk elements 18a, 20a and guide edges of the central disk elements 24a. It can be seen that now these springs 28a are not in the path of torque transmission of the clutch disk between the friction lining elements 16a and the hub 26a, but rather ultimately provide the elastic connection between the damper mass assembly 40a and the hub area 12a or the friction lining elements 16a of the friction lining assembly 14a. In this design, too, therefore, when frictional vibrations occur, the individual damper mass parts 76a are able to vibrate under elastic deformation of the springs 28a in the circumferential direction relative to the rotational axis A, the natural frequency of this vibration depending essentially on the elasticity of the springs 28a, that is, on their spring constant, and on the mass of the damper mass parts 76a or the distribution of the mass of these parts. As also described above, it is possible here, too, through suitable selection of these parameters, to cancel out an excited frequency or to tune the system to several exciting frequencies. To damp the frictional vibrations which may occur as effectively as possible, the area of the mass which makes the most important contribution to the buildup of the counter-vibration or the mass moment of inertia making the most important contribution to this cancellation is again situated in the radial area of the friction lining elements 16a; that is, the damper mass parts 76a are positioned in this area. Of course, the radially inward-projecting areas of the cover disk elements 18a, 20a also contribute to the total mass of the damper mass assembly 40a, although their radial distance to the rotational axis A is shorter and thus their contribution to the moment of inertia is smaller.

The design variant according to FIGS. 5 and 6 ultimately represents a structure similar to that known from other clutch disks, in which the friction lining elements are carried on the cover disk elements 18a, 20a, as also shown in FIG. 1, and the power is taken from the central disk element 24a. To this extent, only a slight change is required in terms of design to connect the friction lining elements 16a to the central disk elements 24a and also to connect the damper mass parts 76a to the cover disk elements 18a, 20a. In addition, it is obvious that springs 28a should be provided which are adapted in terms of their spring constants to the excitation frequency of the vibrations to be damped.

In this design variant, furthermore, it should also be pointed out that it is obvious that a torsional vibration damper, such as the no-load damper known from conventional clutch disks, can also be provided in the path of torque transmission between the friction lining elements 16a and the hub 26a.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A clutch disk comprising:
   a hub area having a rotational axis,
   a friction lining assembly carried by said hub area radially outside of said hub area,
   a damper mass assembly which can move circumferentially around said rotational axis by only a limited amount relative to the hub area and the friction lining assembly, most of said damper mass assembly being circumferentially aligned with said friction lining assembly and
   an elastic support assembly between said damper mass assembly and at least one of said hub area and said friction lining assembly.

2. A clutch disk as in claim 1 wherein the friction lining assembly comprises a plurality of friction lining elements arranged in circumferential sequence about the rotational axis, said damper mass assembly comprising a damper mass part arranged between at least two friction lining elements.

3. A clutch disk as in claim 2 wherein said elastic support assembly supports said damper mass part in the circumferential direction relative to at least one of said two friction lining elements.

4. A clutch disk as in claim 2 further comprising means for guiding circumferential movement of said damper mass part.

5. A clutch disk as in claim 4 wherein said means for guiding circumferential movement comprises a pair of axially spaced cover disk elements, at least one of said cover disk elements extending radially outside of at least one damper mass part, said cover disk elements carrying said friction lining elements.

6. A clutch disk as in claim 5 wherein said hub area comprises a central disk element, which is engageable to a shaft, and a damper element assembly which supports said cover disk elements relative to said central disk element.

7. A clutch disk as in claim 1 wherein said elastic support assembly comprises a plurality of damper elements which support said damper mass assembly relative to said hub area.

8. A clutch disk as in claim 7 wherein said damper mass assembly comprises two axially spaced cover disk elements, said hub area comprises a central disk element between said cover disk elements, said central disk element carrying the friction lining assembly, said damper mass assembly comprising a plurality of damper mass parts, said cover disk elements carrying said plurality of damper mass parts outside of said hub area, said damper elements being supported against said cover disk elements and said central disk element.

9. A clutch disk as in claim 8 wherein the central disk element is engageable to a shaft.

10. A clutch disk as in claim 1 wherein said clutch disk defines a torque transmission path between said hub area and said friction lining assembly, said damper mass assembly lying outside of said torque transmission path.

11. A clutch disk as in claim 1 wherein said elastic support assembly connects said damper mass assembly to at least one of said hub area and said friction lining assembly so that only a limited range of circumferential movement of said damper mass assembly relative to said hub area and said friction lining assembly can occur.

12. A clutch disk as in claim 11, wherein said damper mass assembly is arranged to vibrate circumferentially relative to the hub area and the friction lining assembly within said limited range of circumferential movement.

13. A clutch disk as in claim 12, wherein said damper mass assembly and said elastic support assembly are tuned so that vibration of said damper mass assembly relative to said hub area and said friction linings cancels frictional vibrations which occur during slip operation of a friction clutch equipped with the clutch disk.

14. A friction clutch comprising a clutch disk, said clutch disk comprising a hub area having a rotational axis, a friction lining assembly carried by said hub area radially outside of said hub area, a damper mass assembly which can move circumferentially around said rotational axis by only a limited amount relative to the hub area and the friction lining assembly, most of said damper mass assembly being circumferentially aligned with said friction lining assembly and an elastic support assembly between said damper mass assembly at least one of said hub area and said friction lining assembly.

15. A friction clutch as in claim 14, wherein said elastic support assembly connects said damper mass assembly to at least one of said hub area and said friction lining assembly so that only a limited range of circumferential movement of said damper mass assembly relative to said hub area and said friction lining assembly can occur.

16. A friction clutch as in claim 15, wherein said damper mass assembly is arranged to vibrate circumferentially relative to the hub area and the friction lining assembly within said limited range of circumferential movement.

17. A friction clutch as in claim 16, wherein said damper mass assembly and said elastic support assembly are tuned so that vibration of said damper mass assembly relative to said hub area and said friction linings cancels frictional vibrations which occur during slip operation of said friction clutch.

* * * * *